(12) United States Patent
Kenny et al.

(10) Patent No.: US 10,464,249 B2
(45) Date of Patent: Nov. 5, 2019

(54) ARTICLES HAVING COMPOSITE MEMBER FOR INHIBITING LONGITUDINAL STRETCH

(71) Applicant: EHC CANADA, INC., Oshawa (CA)

(72) Inventors: Andrew Oliver Kenny, Toronto (CA); Naseer Mohammad Qureshi, Maple (CA); Alexander Stuart Caunce, Cobourg (CA); Douglas James Weatherall, Bolton (CA); Qingping Guo, Scarborough (CA); Michael Degli Angeli, Pickering (CA)

(73) Assignee: EHC CANADA, INC., Oshawa (CA)

( * ) Notice: Subject to any disclaimer, the term of this patent is extended or adjusted under 35 U.S.C. 154(b) by 130 days.

(21) Appl. No.: 15/656,078

(22) Filed: Jul. 21, 2017

(65) Prior Publication Data

US 2018/0022005 A1    Jan. 25, 2018

Related U.S. Application Data

(60) Provisional application No. 62/365,589, filed on Jul. 22, 2016, provisional application No. 62/365,612, filed on Jul. 22, 2016.

(51) Int. Cl.
*B29C 47/02* (2006.01)
*B29C 48/15* (2019.01)
(Continued)

(52) U.S. Cl.
CPC ............ *B29C 48/15* (2019.02); *B29C 48/08* (2019.02); *B29C 48/154* (2019.02); *B29C 48/21* (2019.02);
(Continued)

(58) Field of Classification Search
CPC ....................................................... B29C 47/02
(Continued)

(56) References Cited

U.S. PATENT DOCUMENTS

| | | | |
|---|---|---|---|
| 5,566,786 | A | 10/1996 | De Angelis et al. |
| 6,364,061 | B2 | 4/2002 | Baranda et al. |
| 7,235,028 | B2 | 6/2007 | Martin et al. |
| 8,100,796 | B2 | 1/2012 | O'Donnell |
| 9,126,805 | B2 | 9/2015 | Pelto-Huikko et al. |

(Continued)

FOREIGN PATENT DOCUMENTS

| | | |
|---|---|---|
| CN | 102002872 A | 4/2011 |
| EP | 1334943 A1 | 8/2003 |

(Continued)

OTHER PUBLICATIONS

CompositesWorLd, In super-tall buildings, carbon fiber elevator rope rides to the rescue <http://www.compositesworld.com/blog/post/in-super-tall-buildings-carbon-fiber-elevator-rope-rides-to-the-rescue>, accessed Mar. 21, 2016.

(Continued)

*Primary Examiner* — Brent T O'Hern
(74) *Attorney, Agent, or Firm* — Bereskin & Parr LLP/S.E.N.C.R.L., s.r.l.

(57) ABSTRACT

An article may include a carcass or jacket, and at least one composite member arranged within the carcass or jacket for inhibiting longitudinal stretch of the article. The composite member may include a plurality of fibers arranged in a polymeric binder, the polymeric binder bonding the composite member to the carcass or jacket. The carcass or jacket may be formed substantially of rubber or thermoplastic elastomer. The plurality of fibers may include fibers formed substantially from at least one of S-glass, aramid and carbon fiber. The polymer binder may be formed substantially of a thermoplastic material or of a thermoset material. In manufacturing of the article, the carcass or jacket may be extruded to surround the composite member. The article may be a handrail or an elevator belt.

10 Claims, 23 Drawing Sheets

(51) Int. Cl.

| | | |
|---|---|---|
| *B29C 65/70* | (2006.01) | |
| *B29C 48/08* | (2019.01) | |
| *B29C 48/30* | (2019.01) | |
| *B29C 48/86* | (2019.01) | |
| *B29C 48/154* | (2019.01) | |
| *B29C 48/21* | (2019.01) | |
| *B29C 48/34* | (2019.01) | |
| *B29C 48/79* | (2019.01) | |
| *B29K 105/00* | (2006.01) | |
| *B29L 29/00* | (2006.01) | |

(52) U.S. Cl.
CPC .............. *B29C 48/30* (2019.02); *B29C 48/34* (2019.02); *B29C 48/79* (2019.02); *B29C 48/865* (2019.02); *B29C 65/70* (2013.01); *B29K 2105/256* (2013.01); *B29K 2995/0077* (2013.01); *B29L 2029/00* (2013.01)

(58) Field of Classification Search
USPC .......................................................... 428/58
See application file for complete search history.

(56) References Cited

U.S. PATENT DOCUMENTS

| | | |
|---|---|---|
| 2007/0102183 A1 | 5/2007 | Jotti et al. |
| 2007/0155261 A1* | 7/2007 | Cheung ................. B63B 13/00 441/65 |
| 2011/0000746 A1 | 1/2011 | Pelto-Huikko et al. |
| 2014/0305745 A1 | 10/2014 | Alasentie et al. |
| 2015/0191330 A1 | 7/2015 | Zhao et al. |
| 2015/0283750 A1 | 10/2015 | Kenny et al. |

FOREIGN PATENT DOCUMENTS

| | | |
|---|---|---|
| KR | 101564194 B1 | 10/2015 |
| WO | 00/01607 A1 | 1/2000 |
| WO | 2009/033270 A1 | 3/2009 |
| WO | 2009/033272 A1 | 3/2009 |
| WO | 2009/033273 A1 | 3/2009 |
| WO | 2013/110853 A1 | 8/2013 |
| WO | 2015/134023 A1 | 9/2015 |
| WO | 2015/134025 A1 | 9/2015 |
| WO | 2015/165599 A1 | 11/2015 |

* cited by examiner

ARTICLES HAVING COMPOSITE MEMBER FOR INHIBITING LONGITUDINAL STRETCH

CROSS REFERENCE TO RELATED APPLICATIONS

This application claims the benefit of U.S. Provisional Application Nos. 62/365,589 filed Jul. 22, 2016 and 62/365,612 filed Jul. 22, 2016, and each of which is hereby incorporated herein by reference in its entirety.

FIELD

The present disclosure relates generally to handrails suitable for use with an escalator, a moving walkway and/or other transportation apparatus, elevator belts, and other similar articles that include a member for inhibiting longitudinal stretch.

BACKGROUND

The following paragraphs are not an admission that anything discussed in them is prior art or part of the knowledge of persons skilled in the art.

United States Publication No. 2011/0000746 A1 describes a hoisting device rope that has a width larger than a thickness thereof in a transverse direction of the rope. The rope includes a load-bearing part made of a composite material, said composite material comprising non-metallic reinforcing fibers, which include carbon fiber or glass fiber, in a polymer matrix. An elevator includes a drive sheave, an elevator car and a rope system for moving the elevator car by means of the drive sheave. The rope system includes at least one rope that has a width that is larger than a thickness thereof in a transverse direction of the rope. The rope includes a load-bearing part made of a composite material. The composite material includes reinforcing fibers in a polymer matrix.

United States Publication No. 2014/0305745 A1 describes an elevator that includes an elevator car, a counterweight and suspension roping, which connects the elevator car and counterweight to each other, and which suspension roping includes one or more ropes, which include a load-bearing composite part, which includes reinforcing fibers in a polymer matrix. The elevator car and the counterweight are arranged to be moved by exerting a vertical force on at least the elevator car or on the counterweight. The elevator includes a device separate from the suspension roping for exerting the force on at least the elevator car or on the counterweight.

U.S. Pat. No. 9,126,805 B2 describes a rope of a lifting device, more particularly of a passenger transport elevator and/or freight transport elevator, an elevator, and a method for manufacturing the rope. The rope includes an unbroken load-bearing part, the profile of which is essentially of rectangular shape, and the width of the cross-section is greater than the thickness and which load-bearing part comprises glass fiber reinforcements and/or aramid fiber reinforcements and/or carbon fiber reinforcements and/or polybenzoxazole fiber reinforcements and/or polyethylene fiber reinforcements and/or nylon fiber reinforcements in a polymer matrix material. The long sides of the cross-section of the load-bearing part include one or more grooves symmetrically or asymmetrically in the longitudinal direction of the rope, which grooves divide the load-bearing part into smaller parts.

International Publication No. WO 2009/033270 A1 describes A method and apparatus for extrusion of an article. A die assembly can apply flows of thermoplastic material to an array of reinforcing cables to form a composite extrusion. A slider fabric can be bonded to one side of the composite extrusion. After exiting the die assembly, the slider fabric can act to support the extrudate as it passes along an elongate mandrel, which can cause the base of the slider fabric to change shape from a flat profile to the final internal profile of the article. The extruded article can then be cooled to solidify the material. The die can include cooling for the slider fabric and means for promoting penetration of the thermoplastic into reinforcing cables.

International Publication No. WO 2015/134025 A1 describes a belt for suspending and/or driving an elevator car extending longitudinally along a length of the belt. An inner belt layer formed from a first material is bonded to the plurality of tension elements at a first side of the belt. The inner belt layer forms an inner belt surface interactive with a traction sheave of an elevator system. An outer belt layer formed from a second material is bonded to the plurality of tension elements at a second side of the belt. The plurality of tension elements are located between the first side and the second side.

INTRODUCTION

The following paragraphs are intended to introduce the reader to the more detailed description that follows and not to define or limit the claimed subject matter.

In an aspect of the present disclosure, an article may include: a carcass; and at least one composite member arranged within the carcass for inhibiting longitudinal stretch of the article, the composite member including a plurality of fibers arranged in a polymeric binder, the polymeric binder bonding the composite member to the carcass.

In an aspect of the present disclosure, a method of manufacturing an article may include: providing at least one composite member including a plurality of fibers arranged in a polymeric binder; and arranging the composite member within a carcass, wherein the polymeric binder bonds the composite member to the carcass, and wherein the composite member inhibits longitudinal stretch of the article.

In an aspect of the present disclosure, an elevator belt may include: a jacket; and at least one composite member arranged within the jacket for inhibiting longitudinal stretch of the elevator belt, the composite member comprising a plurality of fibers arranged in a polymeric binder, the polymeric binder bonding the composite member to the jacket.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

The technology of interest herein pertains to handrails for use with an escalator, a moving walkway and/or other transportation apparatus or other similar articles that include a composite member for inhibiting longitudinal stretch. The articles include at least one core, stretch-inhibiting element that is formed of a composite material with carbon fiber or other high strength material, e.g., S-glass. The core element may be prepared by pultrusion of filaments drawn thru a die, and embedded into a thermoplastic overcoat to take the form of a flat tape. The core element may then be surrounded by a thermoplastic polyurethane (TPU) carcass and optional cover to form the article. The core element and the carcass may be manufactured by an extrusion process. Through materials selection there may be good adhesion between the core element and the carcass. These and other aspects of the present disclosure are described below.

Figure 1:
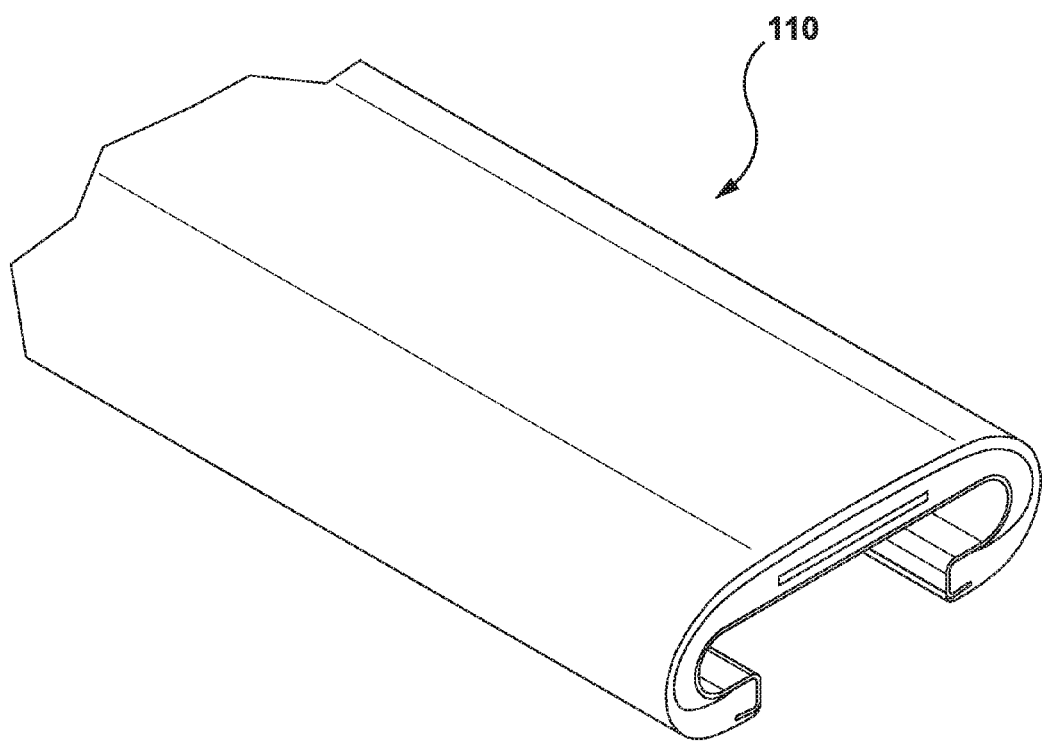
FIG. 1 is a perspective view of an example of a handrail.
Figure 2:
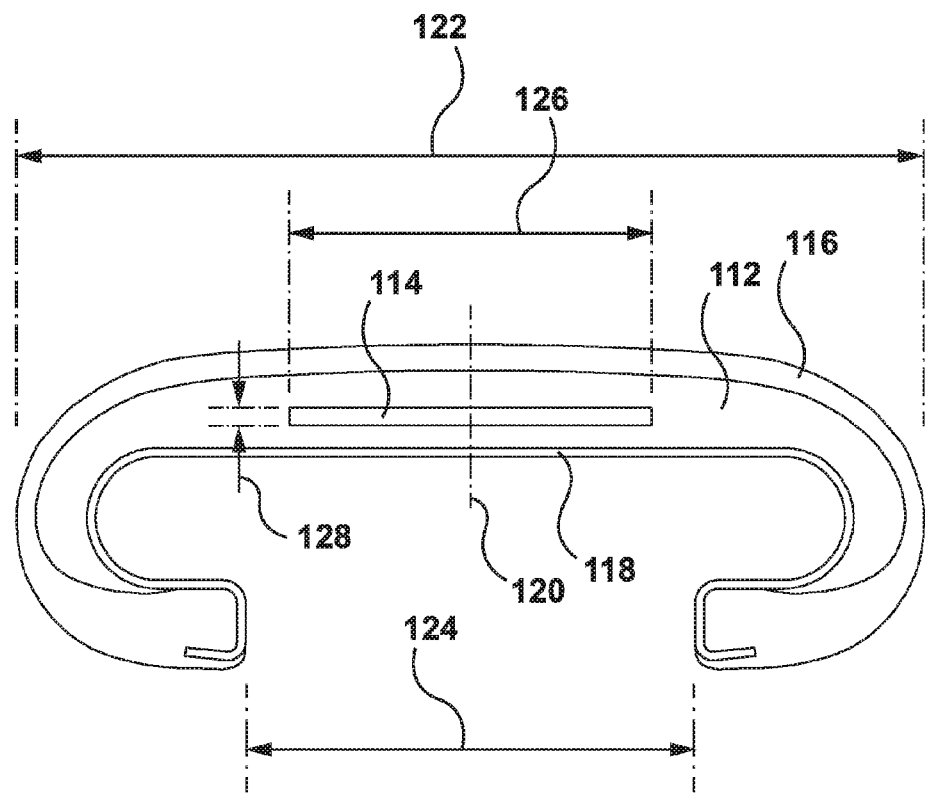
FIG. 2 is a sectional view of the handrail of FIG. 1.

Referring to FIGS. 1 and 2, a handrail is shown generally at reference numeral 110. The handrail 110 includes a jacket or carcass 112, at least one stretch inhibitor 114, a cover 116, and a sliding layer 118.

In the example illustrated, there is a single stretch inhibitor 114 that is arranged longitudinally within the carcass 112. The number of stretch inhibitors may be varied. The cover 116 is shown bonded directly to exterior surfaces of the carcass 112 to form a continuous body. The sliding layer 118 is shown secured to interior surfaces of the carcass 112 and side interior surfaces of the cover 116.

Certain dimensions of the handrail 110 are illustrated in FIG. 2. In the example illustrated, the handrail 110 has a handrail width 122, a mouth width 124, and a stretch inhibitor width 126. The dimensions of the handrail 110 may be varied. In some examples, the handrail width 122 may be between approximately 72 and 80 mm, the mouth width 124 may be between approximately 35 to 40 mm, and the stretch inhibitor width 126 may be between approximately 33 to 38 mm. These dimensions are intended to be illustrative but non-limiting.

In the example illustrated, the stretch inhibitor 114 is centered relative to a central width axis 120 and disposed along a central plane generally vertically intermediate of the carcass 112 so as to be positioned in a neutral plane during flexing. Side edges of the stretch inhibitor 114 are shown offset inwardly in relation to side interior surfaces of the cover 116. In other words, the stretch inhibitor width 126 may be substantially less than the mouth width 124. In operation, having the side edges of the stretch inhibitor 114 spaced away from regions of stress may affect the ability of the stretch inhibitor 114 to retain a neutral plane during flexing.

In some examples, the handrail 110 may be configured generally in accordance with the handrails disclosed in International Publication Nos. WO 2000/001607 A1 and WO 2009/033272 A1. The handrail 110 may also be configured generally in accordance with the disclosure of U.S. Application No. 62/158,348 filed on May 7, 2015 and the corresponding International Patent Application No. PCT/CA2016/050522. The entire contents of International Publication Nos. WO 2000/001607 A1 and WO 2009/033272 A1, U.S. Application No. 62/158,348 and International Patent Application No. PCT/CA2016/050522 are hereby incorporated herein by reference In some examples, at least one composite member is implemented as the stretch inhibitor 114. The composite member may be formed as a "tape" with a plurality of continuous fibers in a polymeric binder. The polymeric binder may be a thermoplastic material, including, for example but not limited to, Isoplast®, thermoplastic polyesters (polybutylene terephthalate, polyethylene terephthalate), and nylon. In some examples, the polymeric binder may be a thermoset polymer, including, for example but not limited to, toluene diisocyanate (TDI) and methylenediphenyl diisocyanate (MDI) cured urethanes, reactive polyesters, vinyl esters, epoxies and acrylic and modified acrylic resins such as Modar™.

In selecting the material for the polymeric binder, it is important to consider its compatibility to the carcass 112 of the handrail 110. In the case of a polyurethane extruded handrail, Isoplast® (not including the glass-filled grades, which may not be suitable) has been found to provide good bonding without adhesives or pre-treatments. Isoplast® is an engineering plastic based on urethane chemistry. The inventors have found that Isoplast® worked well as the chemistry is similar to the TPU that may be used for the carcass 112, so good bonding may be achieved. Other materials based on urethane may also be used, including, for example but not limited to, toluene diisocyanate (TDI) and methylenediphenyl diisocyanate (MDI) cured urethanes. Other materials that may bond well to the carcass 112 are polyesters that are compatible with polyester based TPU, including, for example but not limited to, reactive polyesters, vinyl esters, and thermoplastic polyesters (polybutylene terephthalate, polyethylene terephthalate). Nylons (reactive and thermoplastic) may also be suitable in some examples. Epoxies (thermosetting) are a binder material that is often used for pultrusions and may also be suitable in some examples.

It may be possible to use a hard elastomeric material as the polymeric binder. In some examples, TPUs with a durometer hardness over 45 Shore D may be suitable. Using an elastomer may improve the performance of the stretch inhibitor 114 and the handrail 110 in the transverse direction as these products may fail when flexed in the opposite axis as the fibers. Allowing some movement of the fibers in the matrix may enhance load sharing and increase the fatigue life.

In some examples, the tensile fibers in the composite member for the stretch inhibitor 114 may be glass, including, for example but not limited to, S-glass, aramid (Kevlar®) or carbon fiber. In the composite member, a group of fiber bundles held together by a polymeric binder. The polymer binder allows stresses the handrail product experienced to be transferred into the fibers. The binder must have a good bond to the carcass of the handrail. For example, a peel strength of at least 7 N/mm between the carcass 112 and the stretch inhibitor 114 may be required to ensure proper function.

The fibers may be prepared in the composite member by a pultrusion continuous molding process. In the case of a thermoplastic binder, the fiber matrix may be combined with a thermoplastic polymer powder which is subsequently melted and fused to act as a shaping binder. Alternatively, the fibers may be filled with a low viscosity molten polymer which is then formed into shape in a heated tool. In the case of a thermosetting material, the fibers are pulled through a bath of liquid resin and then through a heated forming tool to compress the composite into the final shape.

The stretch inhibitor 114 provides length and dimensional stability to the handrail 110. The stretch inhibitor 114 may be sized so that it provides the code mandated minimum handrail breaking tensile strength of 25 kN. As a splice will be the weakest part of a handrail product, the stretch inhibitor 114 may have to have a tensile strength of 1.2 to 1.4 times higher than the 25 kN specified by code.

In some examples, the handrail 110 may be a molded product with the carcass 112 and the cover 116 formed of rubber; see, for example, the disclosure of International Publication No. WO 2000/001607 A1. In other examples, the handrail 110 may be an extruded product with the carcass 112 and the cover 116 formed of thermoplastic materials; see, for example, the disclosures of International Publication Nos. WO 2009/033270 A1 and WO 2009/033272 A1. The carcass 112 may be formed of a first thermoplastic material, the cover 116 may be formed of a second thermoplastic material, and the first thermoplastic material may be harder than the second thermoplastic material.

The handrail 110 may be manufactured generally in accordance with the extrusion methods and apparatuses disclosed in International Publication No. WO 2009/033270 A1 and U.S. application Ser. No. 14/744,690 filed on Jun. 19, 2015 and the corresponding International Patent Application No. PCT/CA2016/050708. The handrail 110 may include a slider layer prepared generally in accordance with that disclosed in International Publication No. WO 2009/033273 A1. The entire contents of International Publication No. WO 2009/033270 A1, U.S. application Ser. No. 14/744,690, International Patent Application No. PCT/CA2016/050708, and International Publication No. WO 2009/033273 A1 are hereby incorporated herein by reference.

Although the technique for making the handrail 110 may be similar to that which is disclosed in WO 2009/033270 A1, FIGS. 3 to 8 show a modified extrusion die assembly 130 that is designed to make the handrail 110 with the stretch inhibitor 114 formed of a composite member.

Referring to FIGS. 3 to 8, the extrusion die 130 is shown to include a number of plates that are mounted and together define a forward or inlet side 132, and a rearward or outlet side 134. The stretch inhibitor 114 is conveyed within the extrusion die 130 between the forward and rearward sides 132, 134.

Upstream of the forward side 132, the stretch inhibitor 114 may be unwound from a large coil, e.g., of at least 1 km in length. The stretch inhibitor 114 should be straight, e.g., to at least 1 mm per 1 m length, so that the final product is relatively straight. After unwinding, the stretch inhibitor 114 may be preheated before entry in to the extrusion die 130 to make the thermoplastic "tacky" prior to combination with the carcass. It may be important not to overheat the stretch inhibitor 114 so that the straightness is not affected. The maximum temperature depends on the polymeric binder chosen; in some examples the preheating temperature should not exceed 200° C. Before or after preheating, corona discharge, plasma treatment and/or other surface activation/ cleaning technique may be used to activate and clean the surface of the stretch inhibitor 114 to improve adhesion.

The stretch inhibitor 114 is introduced into the extrusion die 130 by passing through a guide 136 with some clearance to ensure positional accuracy of the stretch inhibitor 114. Clearance may be reduced progressively directly before melt contact to further improve the positional accuracy of the stretch inhibitor 114 within the extrusion die 130.

Figure 3:
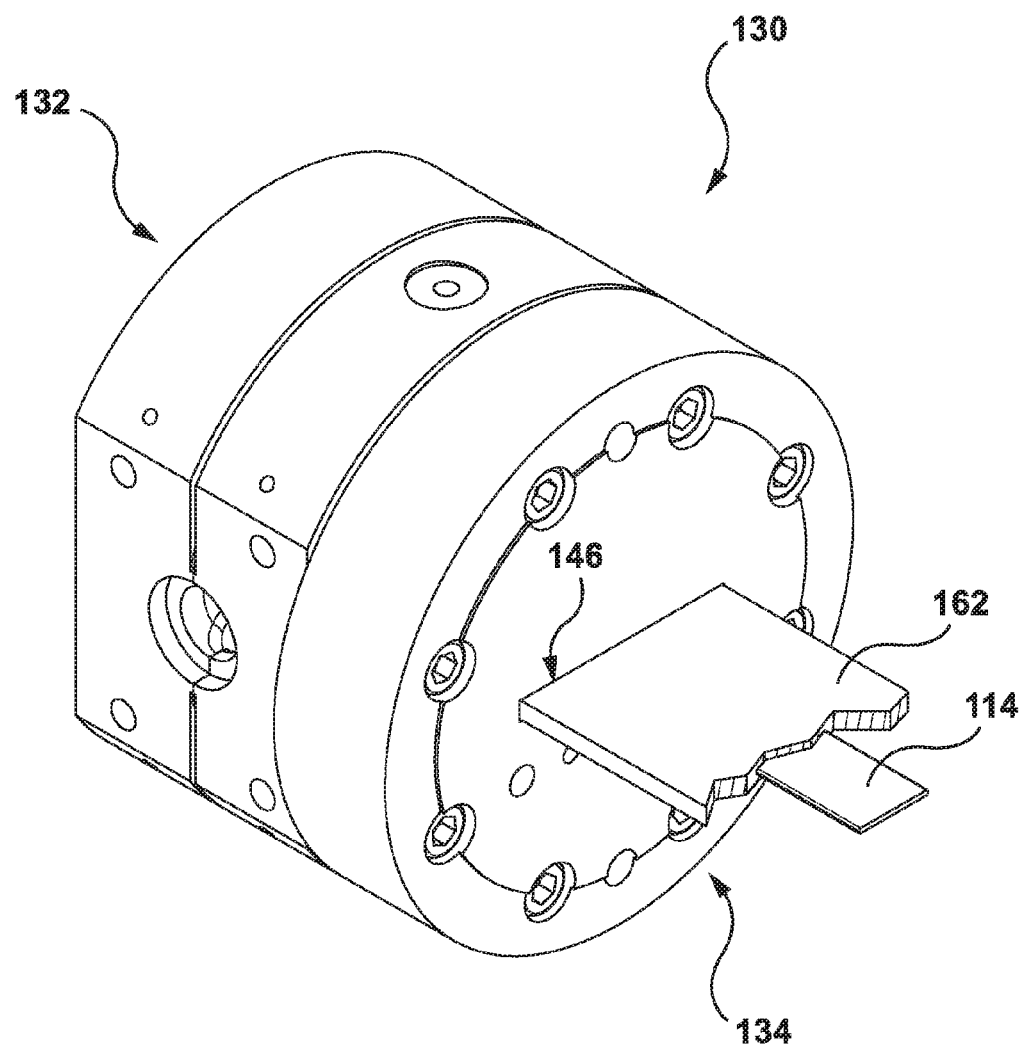
FIG. 3 is a rear perspective view of an extrusion die.
Figure 4:
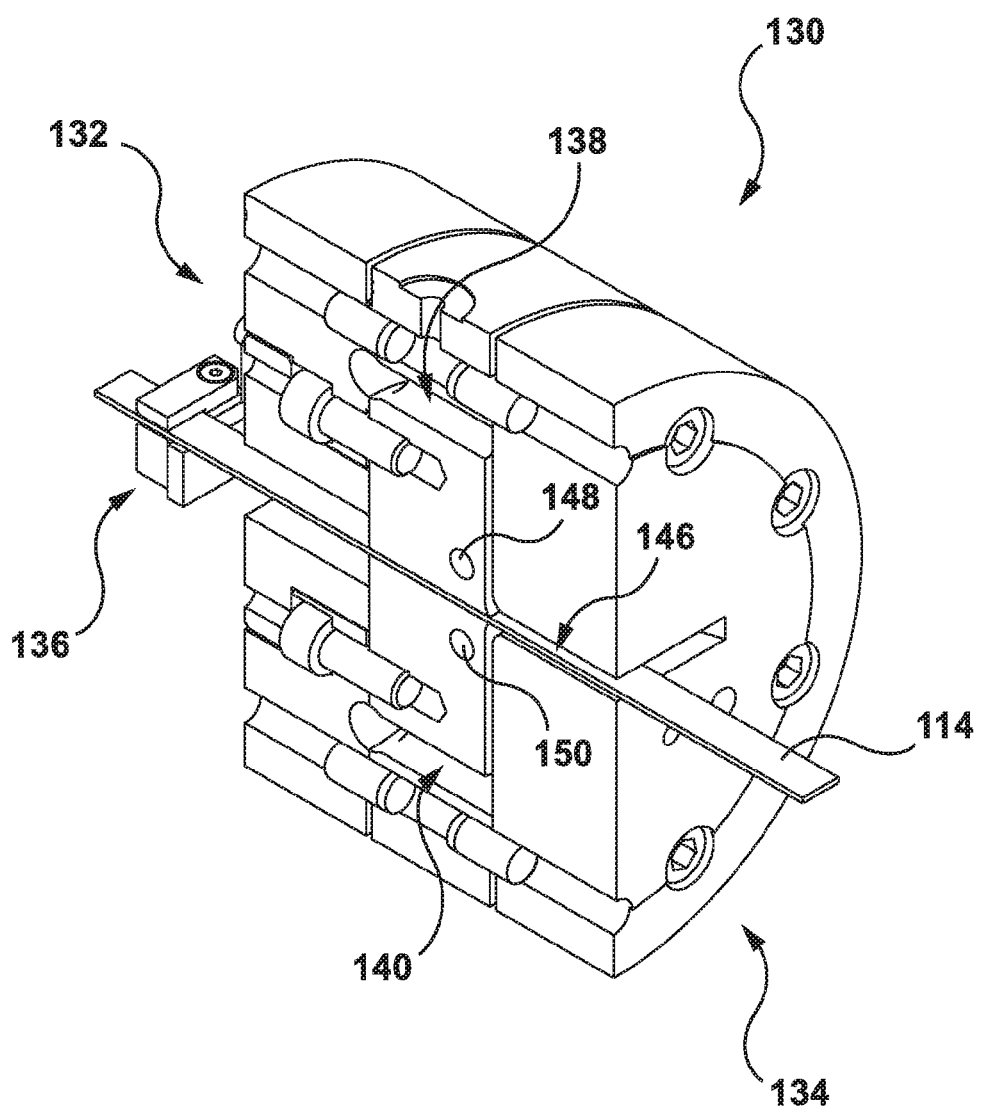
FIG. 4 is a partial rear perspective view of the extrusion die of FIG. 3.
Figure 5:
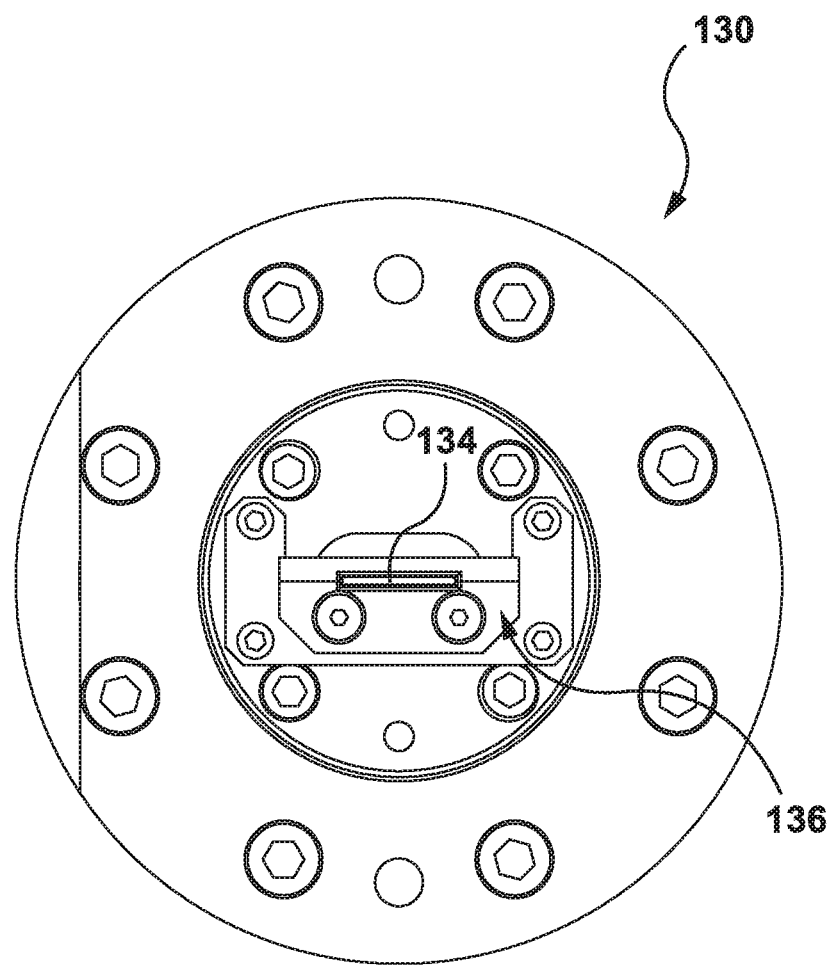
FIG. 5 is a front view of the extrusion die of FIG. 3.
Figure 6:
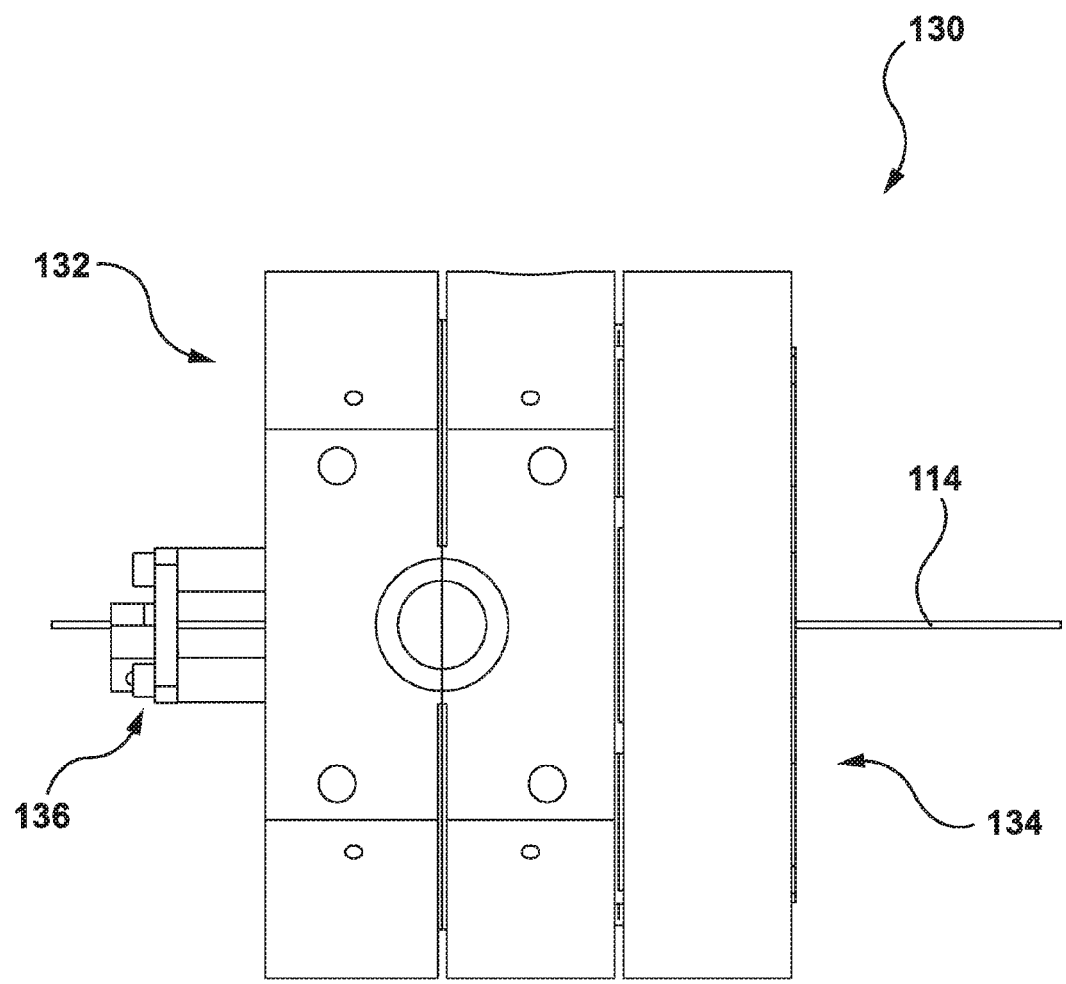
FIG. 6 is a side view of the extrusion die of FIG. 3.
Figure 7:
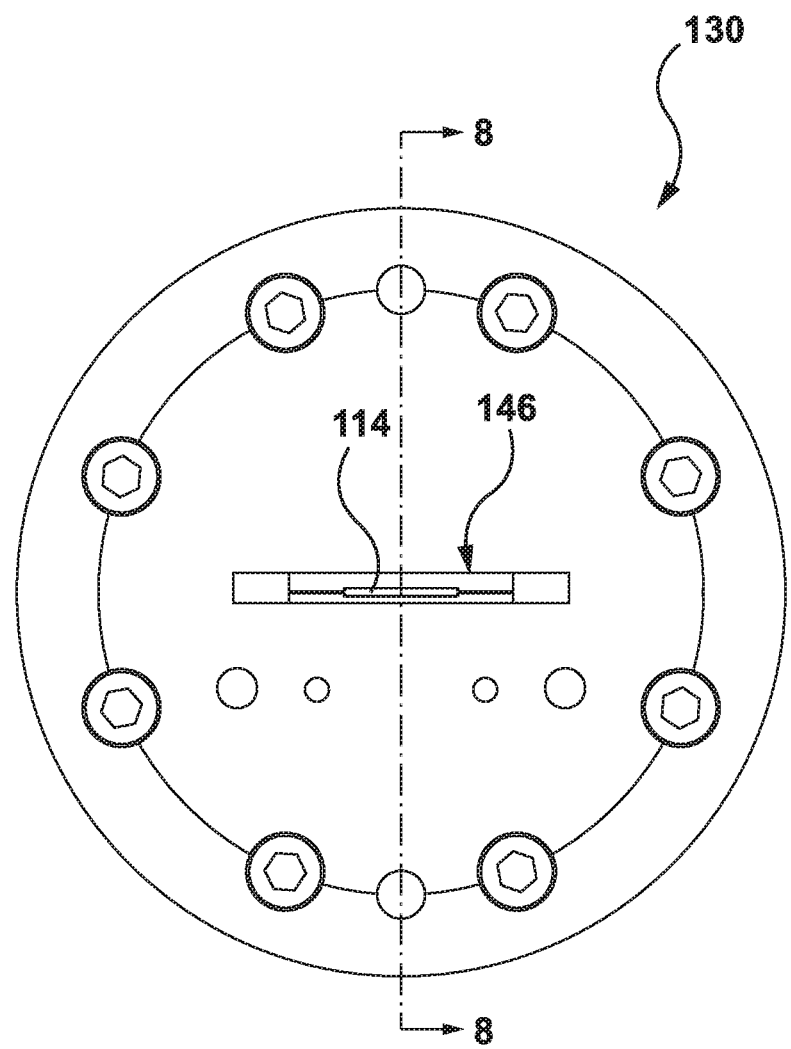
FIG. 7 is a rear view of the extrusion die of FIG. 3.
Figure 8:
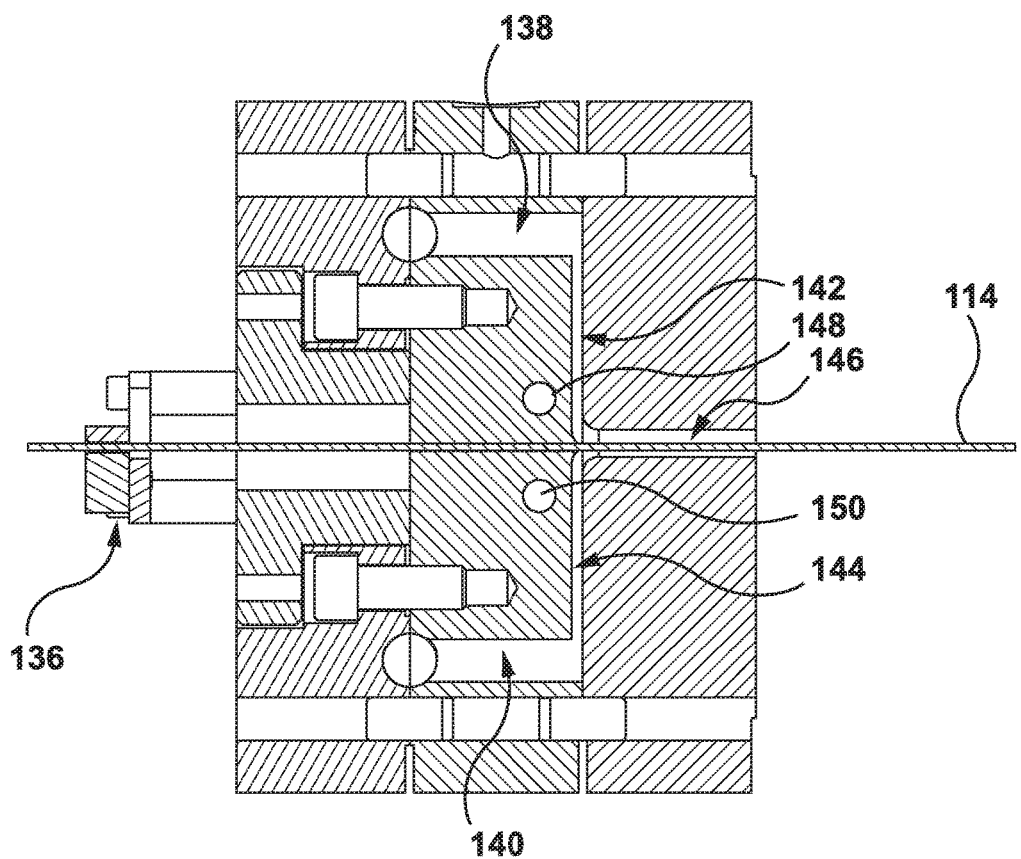
FIG. 8 is a sectional view along line 8-8 in FIG. 3.
Figure 9:
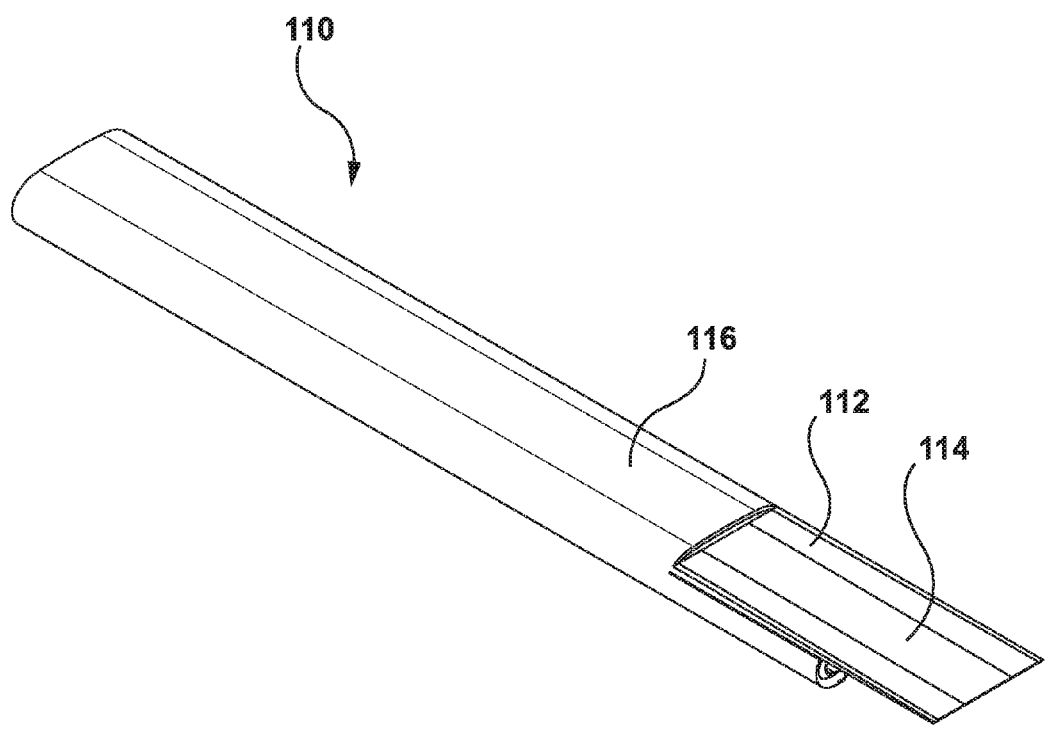
FIG. 9 is a perspective view of a first end portion of a handrail prepared for a splice.
Figure 10:
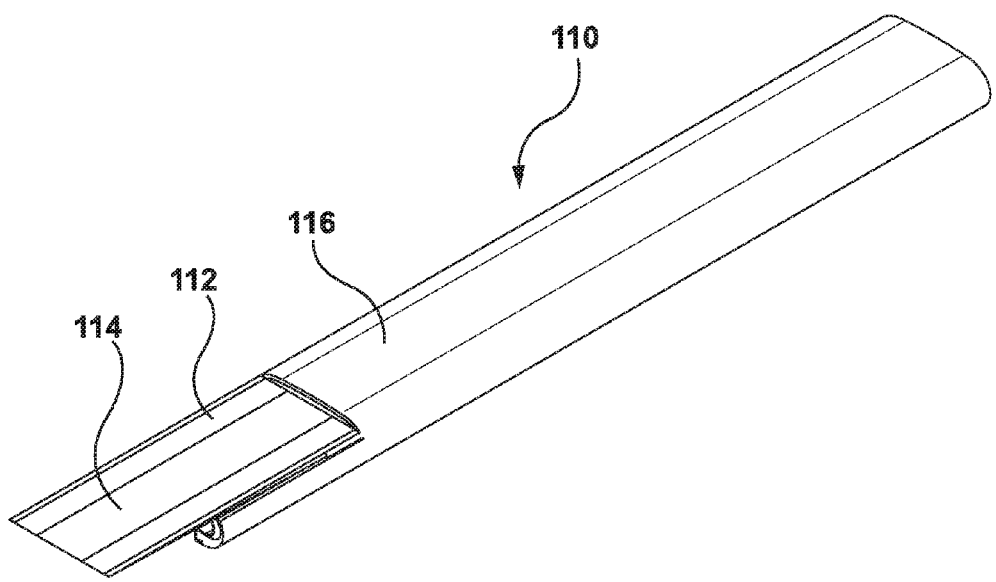
FIG. 10 is a perspective view of a second end portion of a handrail prepared for a splice.

The extrusion die 130 is shown to include upper and lower flow channels 138, 140. The flow channels 138, 140 supply molten polymer through respective passages 142, 144 to a combining slot or zone 146. The stretch inhibitor 114 is embedded in the molten polymer in the combining slot 146. The stretch inhibitor 114 and the polymer exit the rearward side 134 as an intermediate extrudate 162, as shown in FIG. 3. In FIGS. 4 to 8, the polymer flow/extruded polymer is omitted from the drawings for clarity of illustration.

To maximize adhesion between the polymeric binder of the stretch inhibitor 114 and the thermoplastic elastomer used to make the handrail 110, the stretch inhibitor 114 and/or the molten polymer may be heated to increase their temperatures directly before contact with each other. In the example illustrated, the extrusion die 130 is shown to include upper and lower heating elements 148, 150. The heating elements 148, 150 may serve to create localized hot spots in the extrusion die 130 in the area over which the melt will pass before making contact with the stretch inhibitor 114, immediately upstream of a combining slot 146, in order to enhance adhesion between the stretch inhibitor and the molten polymer. In some examples, the heating elements 148, 150 may also serve to heat the stretch inhibitor 114 prior to combination with the molten polymer. TPU may breakdown or dissociate when exposed to temperatures over 230° C., and yet this may enable improved adhesion and may even allow it to bond to materials that it is not generally compatible with. Accordingly, in the case of TPU used for the carcass 112/cover 116, the local hot spot may be at or over 230° C., and possibly at or over 250° C., which may lead to significantly improved adhesion. The stretch inhibitor 114 and polymer exit the rearward side 134 as the intermediate extrudate 162, which may be subsequently formed and cooled. The TPU may reform as it cools, but the localized hot spots should be controlled so that the entire flow is not heated to such high temperatures that there will be irreversible degradation, in which the condition of the melt is adversely affected which may render it difficult to shape and form once it leaves the extrusion tool.

An elongate primary mandrel (not shown herein but disclosed in WO 2009/033270 A1) may be used to shape the intermediate extrudate 162 into the final profile of the handrail 110. The mandrel may include a base and an upper section defining a support surface. The profile of the upper section may change progressively and smoothly, to form the final handrail profile. Slots in the upper section may be connected to a vacuum source to ensure that the sliding layer 118 closely follows the mandrel. As the intermediate extrudate is guided along the mandrel, outer edges of the intermediate extrudate may be progressively dropped downwardly and turned inwardly to form the final C-shaped profile of the handrail 110.

The temperature conditions in the extrusion die 130 may be such that, on leaving the die assembly, the thermoplastic materials of the intermediate extrudate 162 are still molten. Along the mandrel, the sliding layer 118 may remain solid throughout the forming process and may serve as the contact surface, and the molten thermoplastic materials may be untouched. The mandrel may be heated or cooled in order to maintain the intermediate extrudate at an ideal forming temperature.

At the end of the mandrel, the finished profile of the handrail 110 may be formed, and the thermoplastic materials may still not be properly solidified. To cool and solidify the thermoplastic materials, the handrail 110 may be passed into a cooling unit (not shown). A plurality of rollers (not shown) may also be implemented to cool and effect the skinning of the exterior of the handrail 110, the removal of die lines, and/or additional shaping of the exterior surface of the handrail 110.

Using a composite member as stretch inhibitor 114 in the handrail 110 may provide advantages with respect to splicing. When using a cable array, the stretch inhibitor may be joined in a stepped interweave to achieve satisfactory tensile strength; see, for example, the disclosure of U.S. Pat. No. 6,086,806, the entire contents of which are incorporated herein by reference. In such examples, the length of the splice may be 240 mm or more. With the stretch inhibitor 114 formed as a composite member, the length of the splice may be reduced significantly.

Referring to FIGS. 9 to 12, ends of the handrail 110 to be joined may be prepared for splicing by removing the side concave portions and "lips" of the handrail 110, and removing the carcass 112 and cover 116 along the top to expose the stretch inhibitor 114. Next, the stretch inhibitors 114 may be machined to overlap with matching positive and negative tapered sections that extend a length; see the length indicated by reference numeral 152 in FIG. 11.

Figure 11:
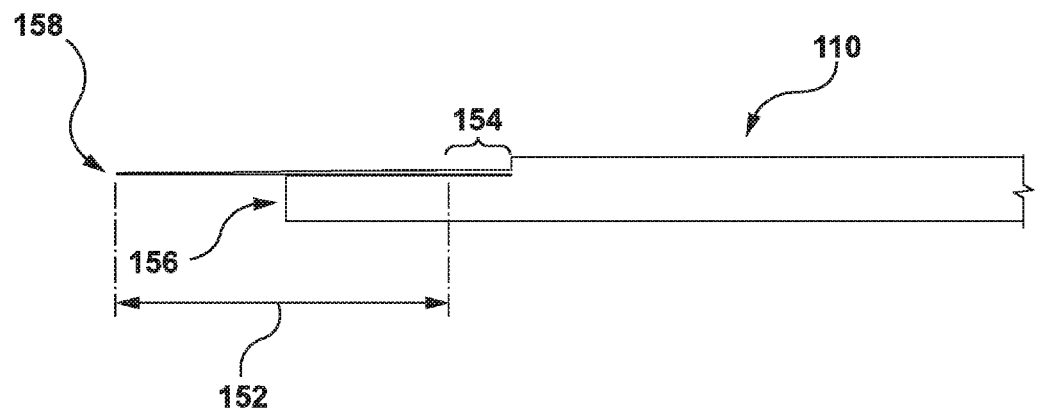
FIG. 11 is a side view of the second end portion of FIG. 10.

Referring to FIG. 11, the length 152 extends from a non-tapered section 154, beyond an abutment end 156 of the handrail 110 to terminate at an outer edge 158. In some examples, the length 152 of the taper may be at least 100 times length as compared to the thickness of the tape, i.e. a 100 mm taper for 1 mm thick stretch inhibitor.

Figure 12:
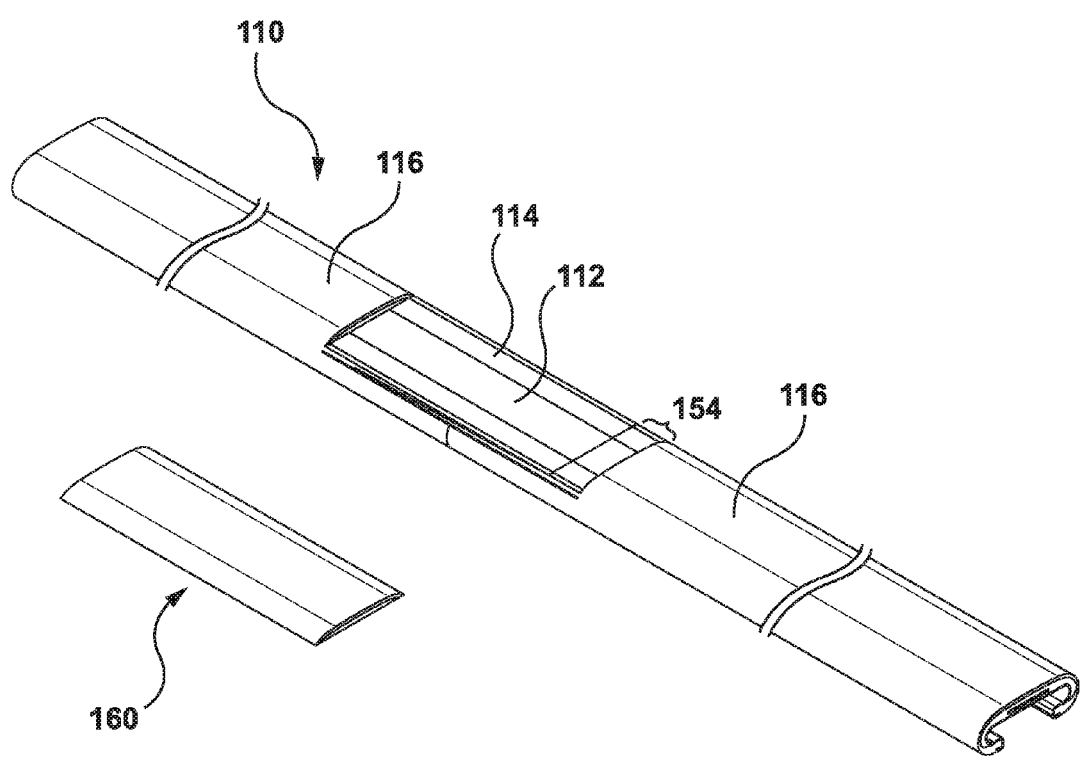
FIG. 12 shows the first end portion of FIG. 10 and the second end portion of FIG. 11 arranged in a splice configuration and an end cap.

Referring to FIG. 12, an adhesive may be applied to setup and join abutting portions of the two ends while the splice is being molded, and an end cap 160 may be provided to complete the splice. The adhesive may be a moisture cure urethane such as Macroplast™ or a solvent based heat activated modified epoxy such as Thixon 405™.

An elevator support belt typically is belt of narrow rectangular section that has a number of steel cables embedded in it. The thermoplastic body of the belt serves mainly to keep the steel cables in a desired array, and the strength of the belt is provided by the steel cables. As the height of an elevator increases, the weight of the steel cables is a limiting factor and becomes a significant part of the load carried by the belt. To enable elevator heights to be increased, manufacturers of cables and belts have turned to other materials that offer a better strength to weight ratio.

The technology of interest herein further pertains to elevator belts or other similar articles that include a composite member for inhibiting longitudinal stretch. The articles include at least one core, stretch-inhibiting element that is formed of a composite material with carbon fiber or other high strength material, e.g., S-glass. The core element may be prepared by pultrusion of filaments drawn thru a die, and embedded into a thermoplastic overcoat to take the form of an elongate element. The core element may then be surrounded by a thermoplastic polyurethane (TPU) jacket. The core element and the jacket may be manufactured by an extrusion process. Through materials selection there may be good adhesion between the core element and the jacket. These and other aspects of the present disclosure are described below.

Figure 13:
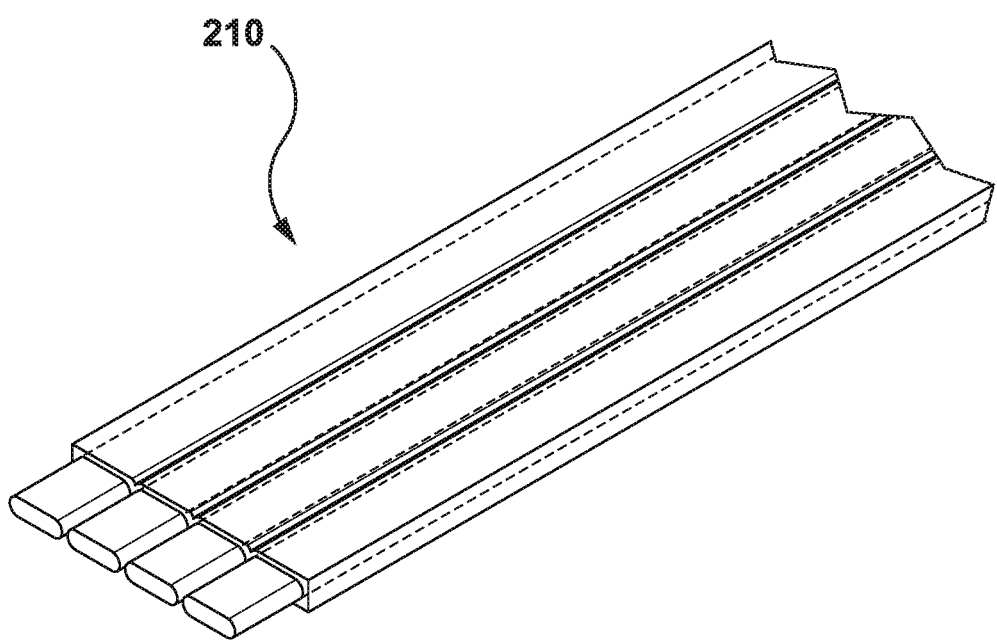
FIG. 13 is a perspective view of an example of an elevator belt.
Figure 14:
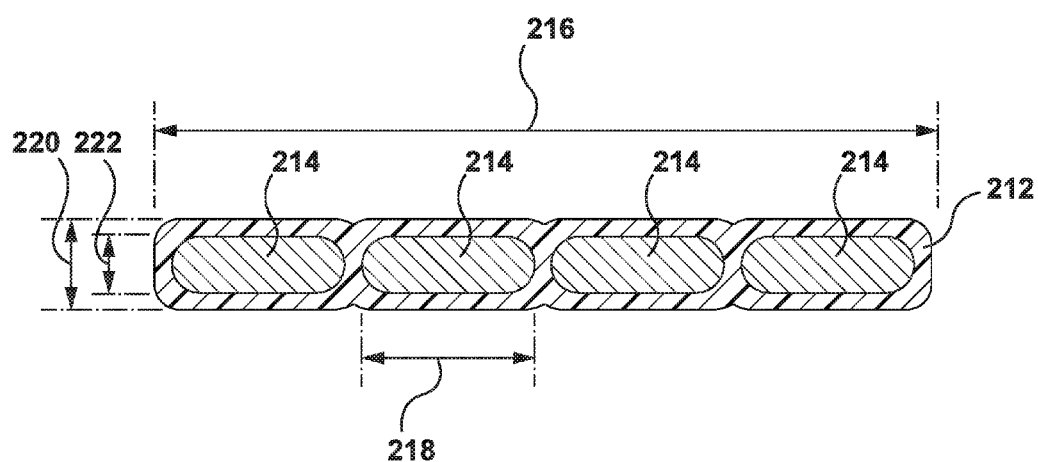
FIG. 14 is a sectional view of the elevator belt of FIG. 13.

Referring to FIGS. 13 and 14, a belt is shown generally at reference numeral 210. The belt 210 includes a carcass or jacket 212 and at least one stretch inhibitor 214. In the example illustrated, the stretch inhibitors 214 are arranged within the jacket 212. The jacket 212 is shown bonded directly to exterior surfaces of the stretch inhibitors 214 to form a continuous body.

In the example illustrated, there are four of the stretch inhibitors 214 that are arranged longitudinally within the jacket 212 and spaced apart horizontally equidistantly. The number of stretch inhibitors may be varied. Each of the stretch inhibitors 214 is disposed along a central plane vertically intermediate of the jacket 212 so as to be positioned in a neutral plane during flexing.

Certain dimensions of the belt 210 are illustrated in FIG. 14. In the example illustrated, the belt 210 has a belt width 216, a core width 218, a belt height 220, and a core height 222. The dimensions of the belt 210 may be varied. In some examples, the belt width 216 may be approximately 44 mm, the core width 218 may be approximately 10 mm, the belt height 220 may be approximately 5 mm, and the core height 222 may be approximately 3 mm. These dimensions are intended to be illustrative but non-limiting.

In some examples, at least one composite member is implemented as each of the stretch inhibitors 214. The composite member may be formed as an elongate element with a plurality of continuous fibers in a polymeric binder. The polymeric binder may be a thermoplastic material, including, for example but not limited to, Isoplast®, thermoplastic polyesters (polybutylene terephthalate, polyethylene terephthalate), and nylon. In some examples, the polymeric binder may be a thermoset polymer, including, for example but not limited to, toluene diisocyanate (TDI) and methylenediphenyl diisocyanate (MDI) cured urethanes, reactive polyesters, vinyl esters, epoxies and acrylic and modified acrylic resins such as Modar™.

In selecting the material for the polymeric binder, it is important to consider its compatibility to the jacket 212 of the belt 210. In the case of a polyurethane extruded belt, Isoplast® (not including the glass-filled grades, which may not be suitable) has been found to provide good bonding without adhesives or pre-treatments. Isoplast® is an engineering plastic based on urethane chemistry. The inventors have found that Isoplast® worked well as the chemistry is similar to the TPU that may be used for the jacket 212, so good bonding may be achieved. Other materials based on urethane may also be used, including, for example but not limited to, toluene diisocyanate (TDI) and methylenediphenyl diisocyanate (MDI) cured urethanes. Other materials that may bond well to the jacket 212 are polyesters that are compatible with polyester based TPU, including, for example but not limited to, reactive polyesters, vinyl esters, and thermoplastic polyesters (polybutylene terephthalate, polyethylene terephthalate). Nylons (reactive and thermoplastic) may also be suitable in some examples. Epoxies (thermosetting) are a binder material that is often used for pultrusions and may also be suitable in some examples.

It may be possible to use a hard elastomeric material as the polymeric binder. In some examples, TPUs with a durometer hardness over 45 Shore D may be suitable. Using an elastomer may improve the performance of the stretch inhibitors 214 and the belt 210 in the transverse direction as these products may fail when flexed in the opposite axis as the fibers. Allowing some movement of the fibers in the matrix may enhance load sharing and increase the fatigue life.

In some examples, the tensile fibers in the composite member for the stretch inhibitors 214 may be glass, including, for example but not limited to, S-glass, aramid (Kevlar®) or carbon fiber. In the composite member, a group of fiber bundles held together by a polymeric binder. The polymer binder allows stresses the belt product experienced to be transferred into the fibers. The binder must have a good bond to the jacket of the belt. For example, a peel strength of at least 7 N/mm between the jacket 212 and the stretch inhibitor 214 may be required to ensure proper function.

The fibers may be prepared in the composite member by a pultrusion continuous molding process. In the case of a thermoplastic binder, the fiber matrix may be combined with a thermoplastic polymer powder which is subsequently melted and fused to act as a shaping binder. Alternatively, the fibers may be filled with a low viscosity molten polymer which is then formed into shape in a heated tool. In the case of a thermosetting material, the fibers are pulled through a bath of liquid resin and then through a heated forming tool to compress the composite into the final shape.

The stretch inhibitors 214 provide length and dimensional stability to the belt 210. The stretch inhibitors 214 may be sized, shaped and configured so that they provide a desired minimum breaking tensile strength for the belt, and/or other mechanical properties for the belt 210.

In some examples, the belt 210 may be an extruded product with the jacket 212 formed of thermoplastic materials; see, for example, the disclosures of International Publication Nos. WO 2009/033270 A1 and WO 2009/033272 A1. In examples in which the belt 210 is utilized as an elevator belt, the material for the jacket 212 may require a combination of properties to enable the belt to provide a smooth comfortable ride and for the belt to last a long time in service. TPU materials may be formulated to achieve the balance of properties needed for a good jacket material for elevator belts.

To achieve a long service life, the jacket material needs to be hard wearing and therefore to have good abrasion resistance and dimensional stability. It also needs to be resistant to hydrolysis and weathering. The material also needs to have good elastic properties and be flexible to allow it to go over tight bending radii. This would enable fairly small diameter machined sheaves to be used to drive these belts. The jacket material also needs to maintain its flexibility and elasticity across a wide service temperature, e.g., ranging from −20 to 50° C. The jacket material should also be resistant to oils and greases as it is may also have exposure to them in an industrial setting.

The belt 210 also needs to have appropriate traction characteristics when in contact with the drive sheave. These traction properties may be tailored by the combined effect of obtaining a defined surface roughness and finish on the belt, as well by incorporating internal lubricants in the jacket material that impart to the belt surface a desired amount of lubricity for optimal traction with the sheave. Also, in order to provide a smooth and vibration free ride, the jacket material should also have good sound and vibration damping properties.

There are different types of TPU materials available in the market. Both polyether-type and polyester-type TPUs may be used to make elevator belt jacket. The polyester-type of TPUs generally have better physical properties such as tensile strength and modulus, abrasion resistance, etc., and they are also generally lower in cost than polyether-type TPUs. However, polyester-type TPU's are susceptible to hydrolysis. Therefore, in some examples, the material used for the jacket 212 may be a polyester-type TPU with hydrolysis stabilizers incorporated in it, e.g., carbodiimide-based materials. An example of a hydrolysis stabilizer is Staboxol 1™, which is a monomeric carbodiimide with the chemical name 2,2',6,6'-tetraisopropyldiphenyl carbodiimide.

The belt 210 may be manufactured generally in accordance with the extrusion methods and apparatuses disclosed in International Publication No. WO 2009/033270 A1, the entire contents of which are hereby incorporated herein by reference. Although the technique for making the belt 210 may be similar to that which is disclosed in WO 2009/033270 A1, FIGS. 15 to 24 show a modified extrusion die assembly 224 that is designed to make the belt 210 with the stretch inhibitors 214 formed of a composite member.

Referring to FIGS. 15 to 24, the extrusion die 224 is shown to include a number of plates that are mounted and together define a forward or inlet side 226, and a rearward or outlet side 228. The stretch inhibitors 214 are conveyed within the extrusion die 224 between the forward and rearward sides 226, 228.

Upstream of the forward side 226, the stretch inhibitors 214 may be unwound from large coils, e.g., of at least 1 km in length. The stretch inhibitors 214 should be straight, e.g., to at least 1 mm per 1 m length, so that the final product is relatively straight. After unwinding, the stretch inhibitors 214 may be preheated before entry in to the extrusion die 224 to make the thermoplastic "tacky" prior to combination with the jacket. It may be important not to overheat the stretch inhibitors 214 so that the straightness is not affected. The maximum temperature depends on the polymeric binder chosen; in some examples the preheating temperature should not exceed 200° C. Before or after preheating, corona discharge, plasma treatment and/or other surface activation/cleaning technique may be used to activate and clean the surface of the stretch inhibitors 214 to improve adhesion.

The stretch inhibitors 214 are introduced into the extrusion die 224 by passing through a guide 230 with some clearance to ensure positional accuracy of each of the stretch inhibitors 214. Clearance may be reduced progressively directly before melt contact to further improve the positional accuracy of the stretch inhibitors 214 within the extrusion die 224.

Figure 15:
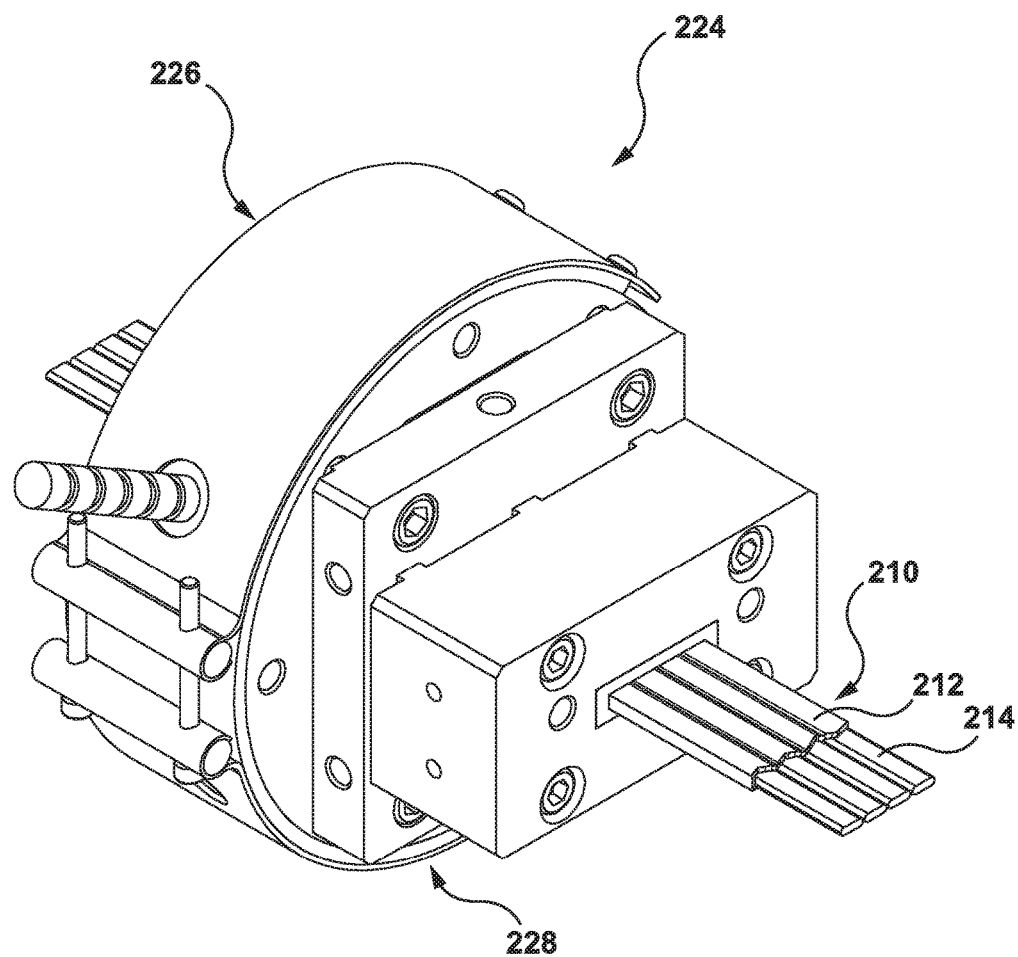
FIG. 15 is a rear perspective view of an extrusion die.
Figure 16:
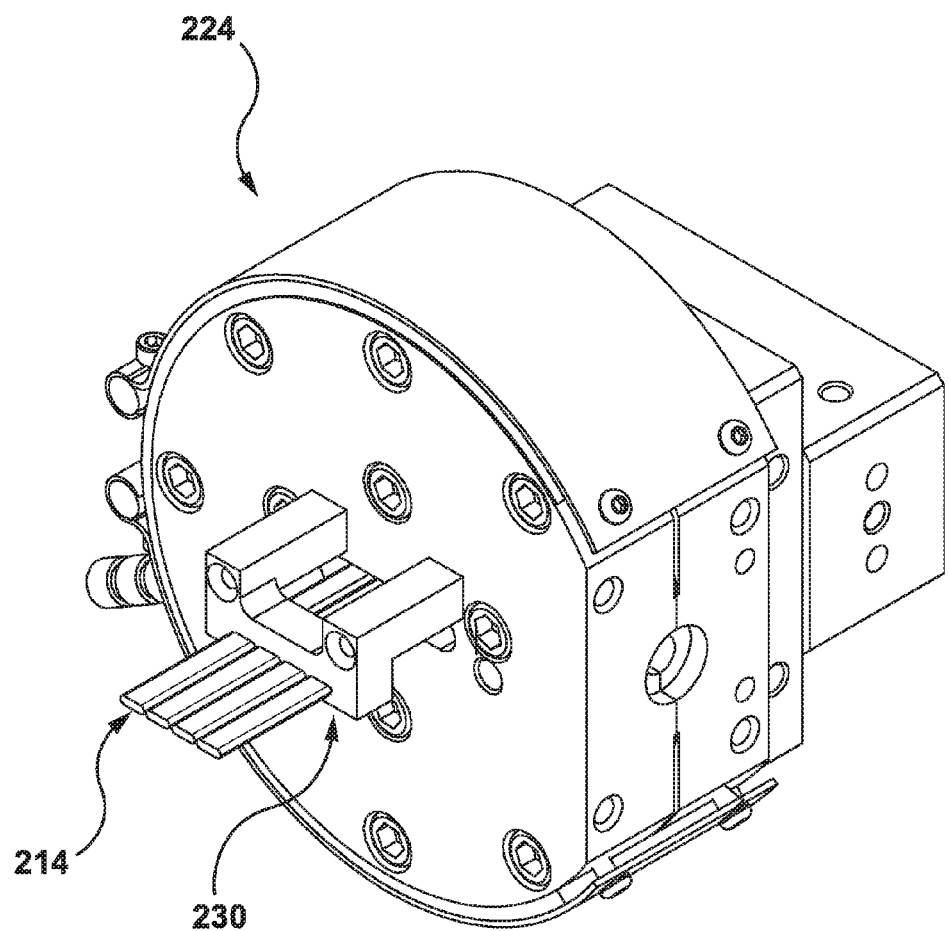
FIG. 16 is a front perspective view of the extrusion die of FIG. 15.
Figure 17:
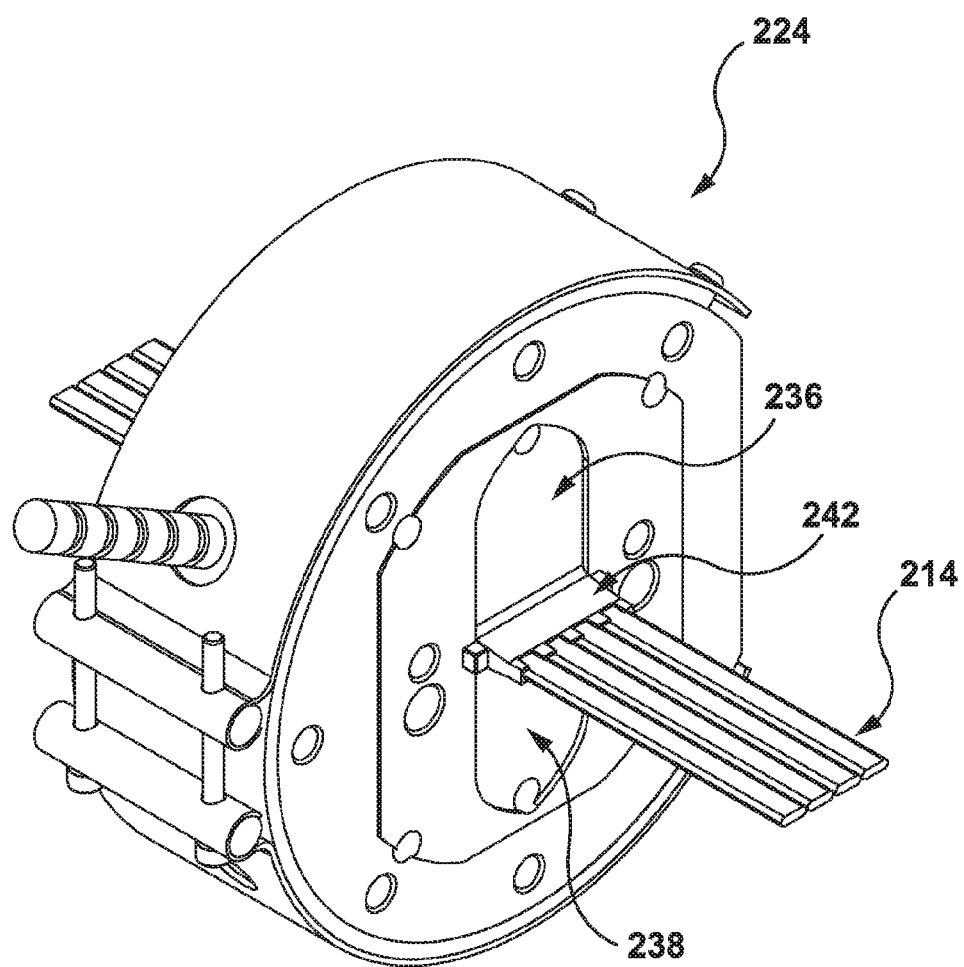
FIG. 17 is a first partial rear perspective view of the extrusion die of FIG. 15.
Figure 18:
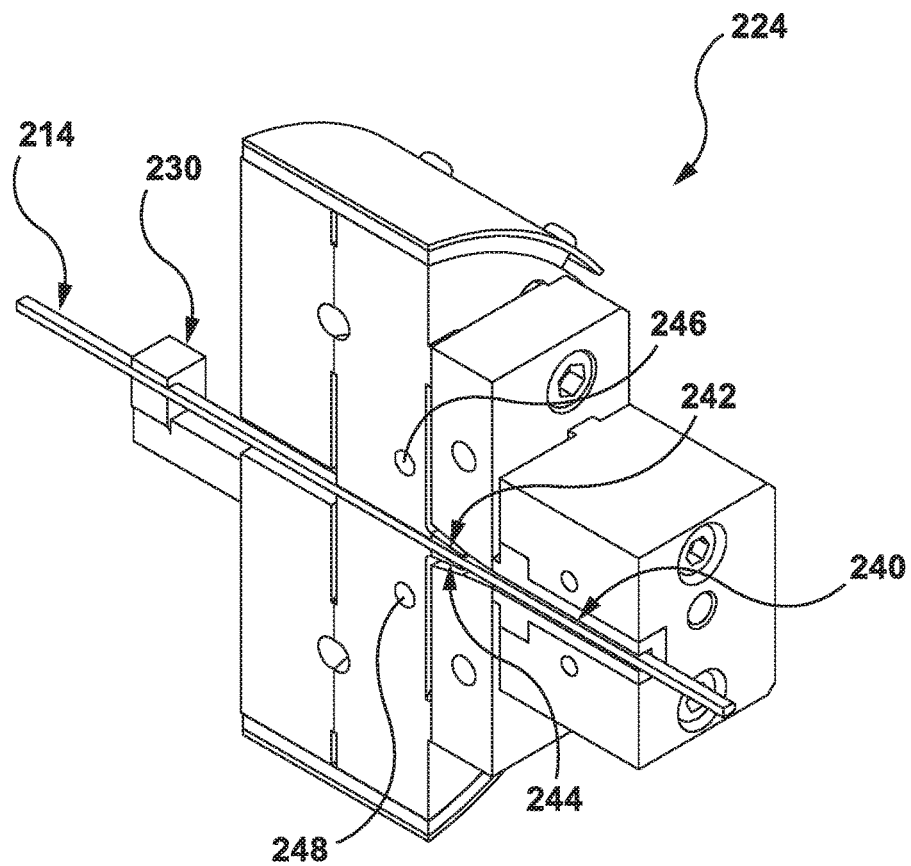
FIG. 18 is a second partial rear perspective view of the extrusion die of FIG. 15.
Figure 19:
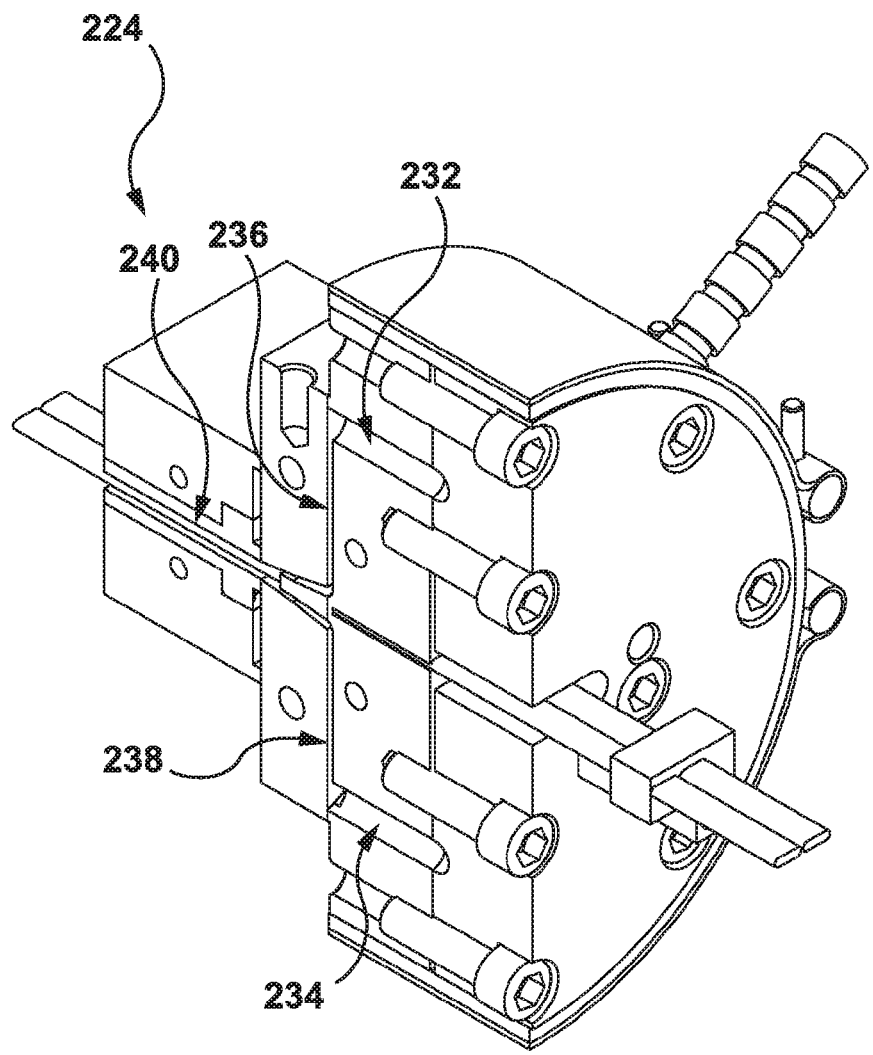
FIG. 19 is a partial front perspective view of the extrusion die of FIG. 15.
Figure 20:
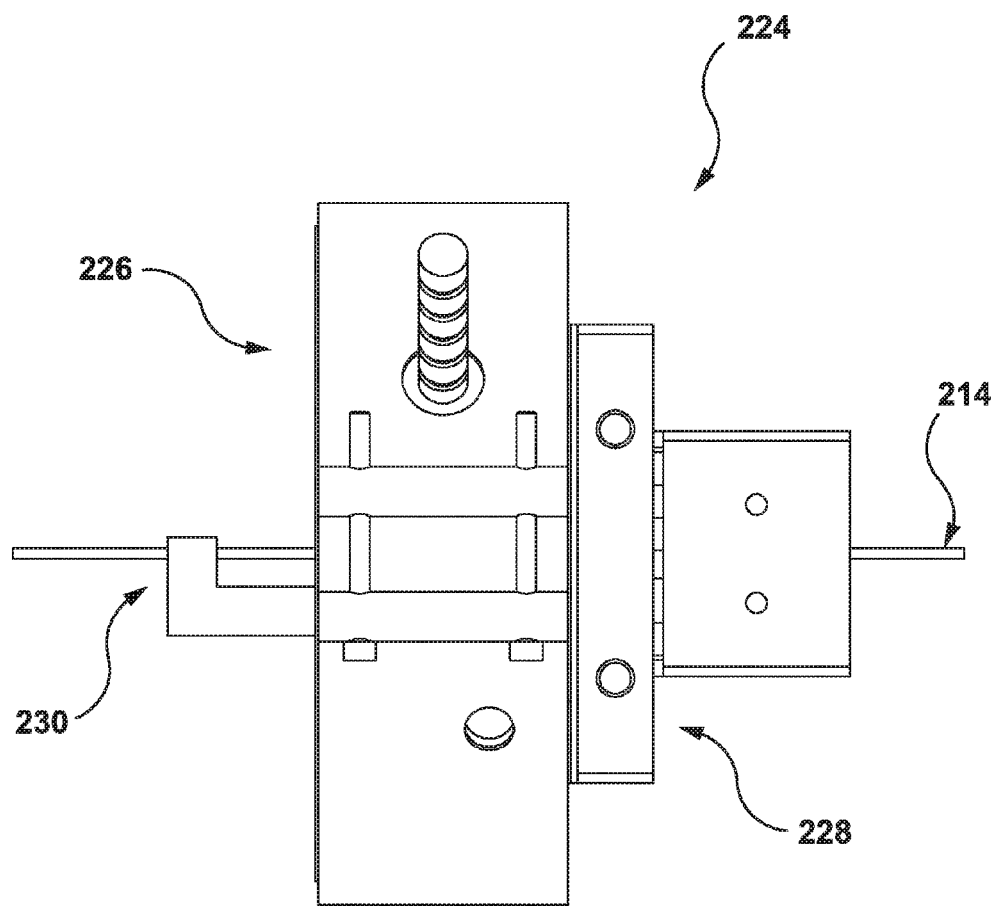
FIG. 20 is a side view of the extrusion die of FIG. 15.
Figure 21:
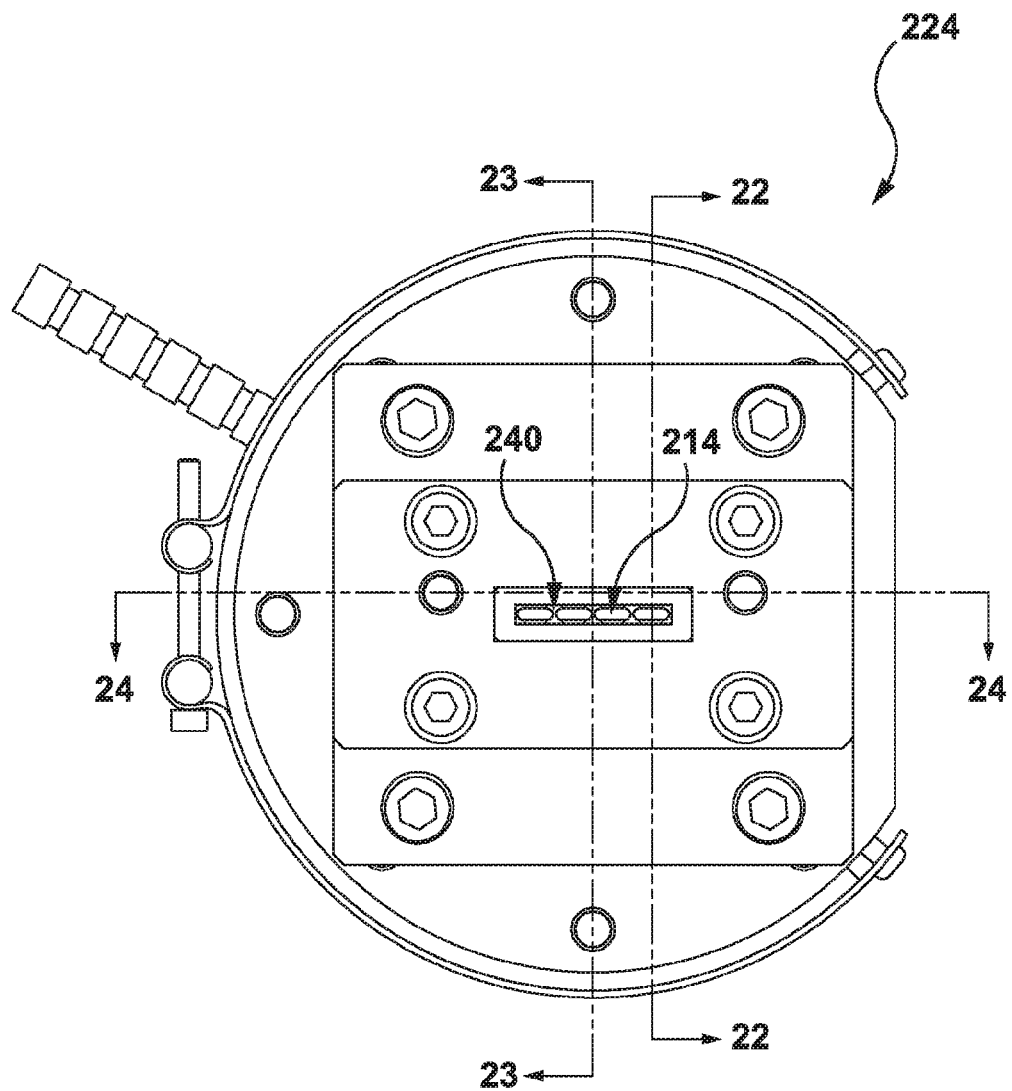
FIG. 21 is a rear view of the extrusion die of FIG. 15.

The extrusion die 224 is shown to include upper and lower flow channels 232, 234. The flow channels 232, 234 supply molten polymer through respective passages 236, 238 to a combining slot or zone 240. The passages 236, 238 are shaped to encourage spreading of the polymer flow. Upper and lower inserts 242, 244 are shown positioned intermediate the passages 236, 238, respectively, and the combining slot 240. The inserts 242, 244 may serve to balance the flow of polymer from the passages 236, 238 to the combining slot 240. The inserts 242, 244 may also serve to maintain the positional accuracy of each of the stretch inhibitors 214 at the rearward side 228, in combination with the guide 230 at the forward side 226. The stretch inhibitors 214 are embedded in the molten polymer in the combining slot 240. The stretch inhibitors 214 and polymer exit the rearward side 234 as an extrudate, as shown in FIG. 15. In FIGS. 16 to 24, the polymer flow/jacket 212 is omitted from the drawings for clarity of illustration.

Figure 22:
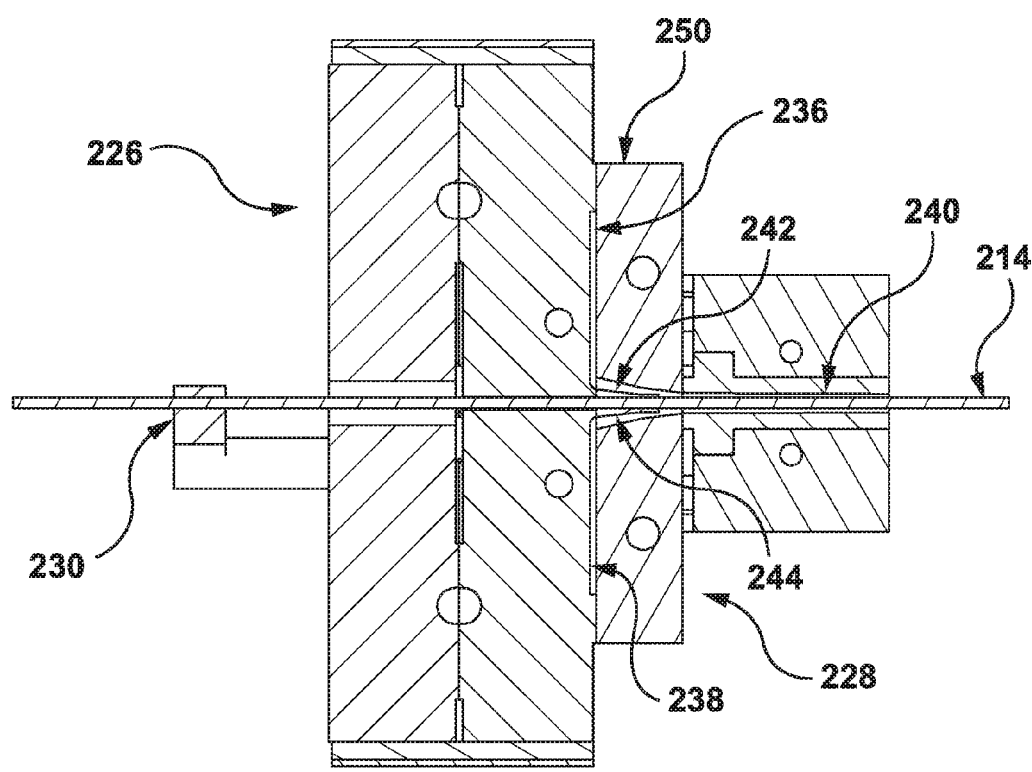
FIG. 22 is a sectional view along line 22-22 in FIG. 21.
Figure 23:
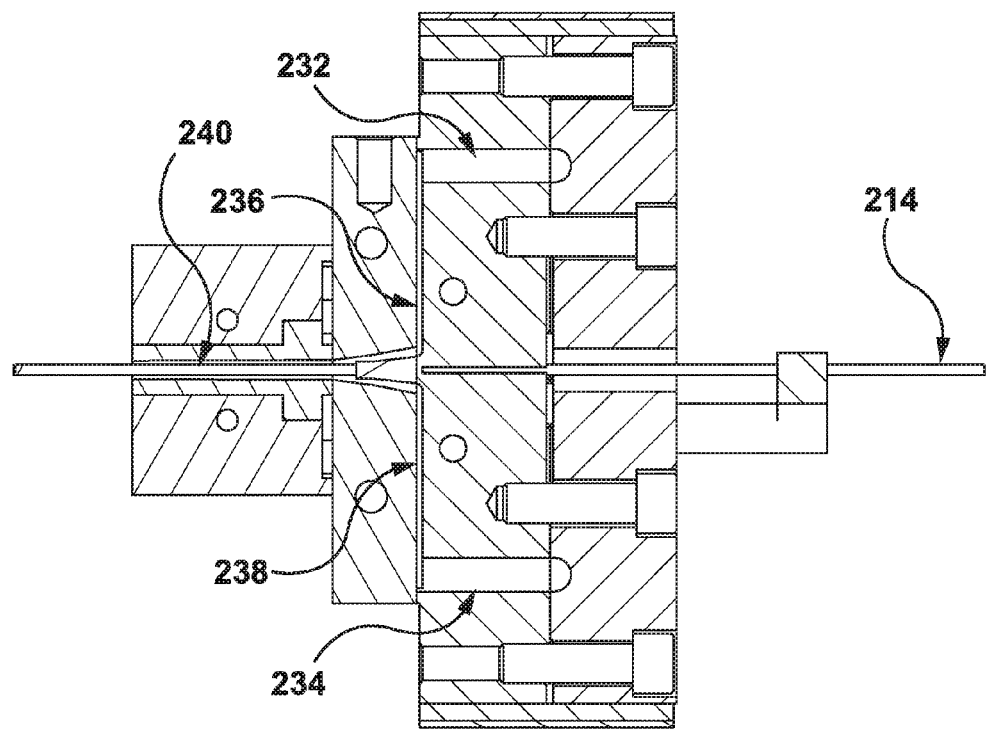
FIG. 23 is a sectional view along line 23-23 in FIG. 21.
Figure 24:
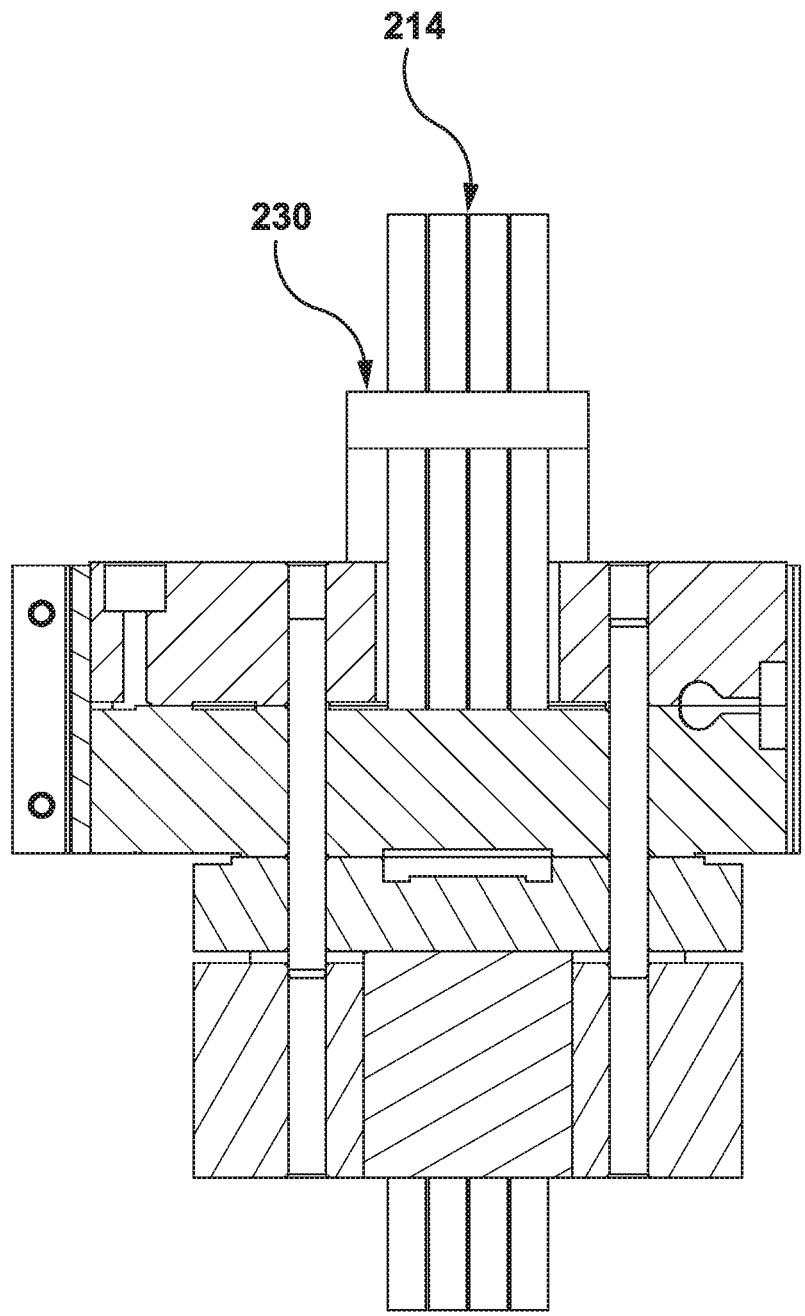
FIG. 24 is a sectional view along line 24-24 in FIG. 21.

FIG. 22 shows a choke plate 250 that surround the inserts 242, 244. In some examples, dimensions between the insert 242 and the choke plate 250 may be slightly greater than between the insert 244 and the choke plate 250, so that the polymer is forced downwardly onto the stretch inhibitors 214. This may bias the stretch inhibitors 214 downwardly within the extrusion die 224, which may help to maintain desired positioning of the extrudate as it exits the extrusion die 224.

To maximize adhesion between the polymeric binder of the stretch inhibitors 214 and the thermoplastic elastomer used to make the belt 210, the stretch inhibitors 214 and/or the molten polymer may be heated to increase their temperatures directly before contact with each other. In the example illustrated, the extrusion die 224 is shown to include upper and lower heating elements 246, 248. The heating elements 246, 248 may serve to create localized hot spots in the extrusion die 224 in the area over which the melt will pass before making contact with the stretch inhibitors 214, immediately upstream of a combining slot 240, in order to enhance adhesion between the stretch inhibitor and the molten polymer. In some examples, the heating elements 246, 248 may also serve to heat the stretch inhibitors 214 prior to combination with the molten polymer. TPU may breakdown or dissociate when exposed to temperatures over 230° C., and yet this may enable improved adhesion and may even allow it to bond to materials that it is not generally compatible with. Accordingly, in the case of TPU used for the jacket of the jacket 212, the local hot spot may be at or over 230° C., and possibly at or over 250° C., which may lead to significantly improved adhesion. The stretch inhibitors 214 and polymer exit the rearward side 234 as an extrudate, which may be subsequently formed and cooled. The TPU may reform as it cools, but the localized hot spots should be controlled so that the entire flow is not heated to such high temperatures that there will be irreversible degradation, in which the condition of the melt is adversely affected which may render it difficult to shape and form once it leaves the extrusion tool, if desired.

The subject matter of interest is not necessarily limited to handrails and elevator belts, and may apply more broadly to other articles of constant cross section.

While the above description provides examples of one or more apparatuses or methods, it will be appreciated that other apparatuses or methods may be within the scope of the accompanying claims.

We claim:

1. An article, comprising:
a carcass; and
at least one composite member arranged within the carcass for inhibiting longitudinal stretch of the article, the at least one composite member comprising a plurality of fibers arranged in a polymeric binder, the polymeric binder bonding the at least one composite member to the carcass,
wherein the at least one composite member is disposed along a central plane generally intermediate of the carcass so as to be positioned in a neutral plane during flexing.

2. The article of claim 1, wherein the carcass is formed substantially of thermoplastic polyurethane.

3. The article of claim 2, wherein the plurality of fibers comprises fibers formed substantially from at least one of S-glass, aramid and carbon fiber.

4. The article of claim 3, wherein the polymeric binder is formed substantially of a thermoplastic material selected from a group consisting of thermoplastic polyester, polybutylene terephthalate, polyethylene terephthalate, engineered thermoplastic polyurethane and nylon.

5. The article of claim 3, wherein the polymeric binder is formed substantially of a thermoset material selected from a group consisting of toluene diisocyanate (TDI) cured urethane, methylenediphenyl diisocyanate (MDI) cured urethane, reactive polyester, vinyl ester, epoxy, acrylic resin and modified acrylic resin.

6. The article of claim 1, comprising a splice joint between two adjoining ends of the article, the splice joint comprising overlapping portions of the at least one composite member and an adhesive therebetween.

7. The article of claim 6, wherein the overlapping portions comprise matching positive and negative tapered sections, and a ratio of a length of the tapered section and a thickness of the at least one composite member is at least 100:1.

8. The article of claim 1, comprising a cover at least partially surrounding and bonded to the carcass, the carcass is formed of a first thermoplastic material, the cover is formed of a second thermoplastic material, and the first thermoplastic material is harder than the second thermoplastic material.

9. The article of claim 8, wherein the article is a handrail.

10. The article of claim 9, wherein the at least one composite member is arranged centered relative to a central width axis of the article, and side edges of the at least one composite member are offset inwardly in relation to side interior surfaces of the cover.

* * * * *